(12) United States Patent
Ryon et al.

(10) Patent No.: US 11,692,487 B2
(45) Date of Patent: Jul. 4, 2023

(54) HEAT SHIELDING FOR INTERNAL FUEL MANIFOLDS

(71) Applicant: Delavan Inc., West Des Moines, IA (US)

(72) Inventors: Jason A. Ryon, Carlisle, IA (US); Lev A. Prociw, Johnston, IA (US); Gregory A. Zink, Des Moines, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/578,926

(22) Filed: Jan. 19, 2022

(65) Prior Publication Data

US 2022/0136443 A1 May 5, 2022

Related U.S. Application Data

(62) Division of application No. 16/224,127, filed on Dec. 18, 2018, now Pat. No. 11,255,270.

(51) Int. Cl.
*F02C 7/22* (2006.01)
*F23R 3/28* (2006.01)
*F02C 7/24* (2006.01)

(52) U.S. Cl.
CPC ............... *F02C 7/24* (2013.01); *F02C 7/222* (2013.01); *F23R 3/283* (2013.01);
(Continued)

(58) Field of Classification Search
CPC ............ F05D 2240/35; F05D 2230/20; F05D 2230/22; F05D 2230/30; F05D 2230/31;
(Continued)

(56) References Cited

U.S. PATENT DOCUMENTS 5,415,000 A  5/1995 Mumford et al.
5,653,109 A  8/1997 Overton et al.
(Continued)

FOREIGN PATENT DOCUMENTS

EP  1010946 A2  6/2000
EP  1167882 A1  1/2002
(Continued)

OTHER PUBLICATIONS

Extended European Search Report dated May 27, 2020, issued during the prosecution of European Patent Application No. EP 19215138.9.

*Primary Examiner* — Todd E Manahan
*Assistant Examiner* — Sean V Meiller
(74) *Attorney, Agent, or Firm* — Locke Lord LLP; Joshua L. Jones; Scott D. Wofsy

(57) ABSTRACT

A fuel injector system includes an outer support and an inner support, with a feed arm extending radially between the inner support and the outer support. A plurality of outlet openings extend in an axial direction from the feed arm for feeding respective injection nozzles. The outer support and feed arm define a plurality of fuel passages therethrough to convey fluid from an external source through the outer support and feed arm to the outlet openings. A heat shield extends around the feed arm from the outer support to the inner support. The heat shield is spaced apart from the feed arm with an insulative gap therebetween.

4 Claims, 4 Drawing Sheets

(52) U.S. Cl.
CPC .... *F05D 2240/35* (2013.01); *F05D 2260/231* (2013.01); *F05D 2270/3032* (2013.01)

(58) Field of Classification Search
CPC ......... F05D 2240/15; F05D 2270/3032; F05D 2260/231; F02C 7/24; F02C 7/228; F02C 7/222; F23R 3/28; F23R 2900/00018; F23R 3/002; F23R 3/283; F23R 3/60; F23R 3900/00005; F23R 3900/00001; F23R 3900/00017; B33Y 10/00
See application file for complete search history.

(56) References Cited

U.S. PATENT DOCUMENTS

| | | | |
|---|---|---|---|
| 6,736,338 B2 | 5/2004 | Johnson et al. | |
| 7,832,377 B2 | 11/2010 | Lee et al. | |
| 8,308,076 B2 | 11/2012 | Oskooei | |
| 9,649,690 B2* | 5/2017 | McMahan | B32B 7/027 |
| 9,784,187 B2* | 10/2017 | Wolfe | F02C 7/222 |
| 9,791,153 B2 | 10/2017 | Dai et al. | |
| 10,488,047 B2 | 11/2019 | Ott et al. | |
| 2008/0072598 A1 | 3/2008 | Fish et al. | |
| 2011/0247590 A1 | 10/2011 | Donovan | |
| 2016/0003556 A1* | 1/2016 | Ott | F28F 1/00 165/177 |
| 2016/0245187 A1 | 8/2016 | Prociw | |
| 2016/0376997 A1* | 12/2016 | Prociw | F23D 11/107 60/739 |
| 2018/0128492 A1 | 5/2018 | Boardman et al. | |

FOREIGN PATENT DOCUMENTS

| | | |
|---|---|---|
| EP | 2375164 A2 | 10/2011 |
| EP | 3382280 A1 | 10/2018 |
| WO | 2015/060956 | 4/2015 |

* cited by examiner

HEAT SHIELDING FOR INTERNAL FUEL MANIFOLDS

CROSS-REFERENCE TO RELATED APPLICATIONS

This is a divisional of U.S. patent application Ser. No. 16/224,127 filed Dec. 18, 2018 the contents of which are incorporated herein by reference in their entirety.

BACKGROUND OF THE INVENTION

1. Field of the Invention

The present disclosure relates to combustion, and more particularly to internally manifolded multipoint injection systems such as used for combustion in gas turbine engines.

2. Description of Related Art

Multipoint fuel injection systems would benefit from a simple, low cost fuel injector and manifold construction to permit a large number of injectors to be used. Traditional fuel injector and nozzle designs require complex manifolding that can impede air flow from a compressor to the combustor in a gas turbine engine. Advanced engines require thermal protection to prevent fuel from reaching a temperature where it can break down and grow internal carbon build up.

Such conventional methods and systems have generally been considered satisfactory for their intended purpose. However, there is still a need in the art for improved multipoint combustion systems. The present disclosure provides a solution for this need.

SUMMARY OF THE INVENTION

A fuel injector system includes an outer support and an inner support, with a feed arm extending radially between the inner support and the outer support. A plurality of outlet openings extend in an axial direction from the feed arm for feeding respective injection nozzles. The outer support and feed arm define a plurality of fuel passages therethrough to convey fluid from an external source through the outer support and feed arm to the outlet openings. A heat shield extends around the feed arm from the outer support to the inner support. The heat shield is spaced apart from the feed arm with an insulative gap therebetween.

The heat shield can be spaced apart from the feed arm. The heat shield can include openings therethrough for connection of injection nozzles to the outlet openings. The heat shield can be solely supported by flexure structures that connect the heat shield to the inner and outer supports. Each flexure structure can define a plurality of holes through the heat shield into the insulative gap. Each flexure structure can define a sigmoid cross-sectional shape in radial cross-section.

The feed arm can include a plurality of vaulted chambers defined therein between columns. The columns can be spaced apart from the heat shield. There can be a respective aperture through the heat shield proximate to each column.

A multipoint fuel injection system includes a circumferentially extending outer support and a circumferentially extending inner support, with a plurality of circumferentially spaced apart feed arms extending radially between the inner support and the outer support. A plurality of outlet openings extend in an axial direction from each feed arm for feeding respective injection nozzles. The outer support and feed arm define a plurality of fuel passages therethrough to convey fluid from an external source through the outer support and feed arm to the outlet openings. A single heat shield extends around the feed arms from the outer support to the inner support. The heat shield is spaced apart from the feed arms with an insulative gap therebetween.

The outer support can define a manifold portion of the fuel passages extending therethrough in a circumferential direction, wherein the manifold portions have axially oriented vaulted surfaces. The inner support can define weight reduction voids defined therein, wherein the weight reduction voids have axially oriented vaulted surfaces. Circumferential portions of the heat shield can extend circumferentially from feed arm portions of the heat shield.

An outer diffuser can extend in an upstream direction from the outer support and can be positioned radially outboard of the outer support to provide heat shielding to the outer support. An inner diffuser can extend in an upstream direction from the inner support and can be positioned radially inboard of the inner support to provide heat shielding to the inner support. A combustor dome can define a combustion space with an inner combustor wall and an outer combustor wall, wherein the combustor dome, inner wall, and outer wall are positioned to provide heat shielding to the inner and outer supports on a combustor side thereof.

A method of making a fuel injector system includes additively manufacturing a circumferentially extending outer support together with a circumferentially extending inner support, a feed arm extending radially between the inner support and the outer support, and a heat shield extending around the feed arm from the outer support to the inner support wherein the heat shield is spaced apart from the feed arm with an insulative gap. Additively manufacturing includes building in an axial direction beginning from downstream portions of the inner and outer supports.

Additively manufacturing can include forming the feed arm with a plurality of vaulted chambers therein defined between columns, wherein the columns are attached to the heat shield, and further comprising at least one of: breaking the columns apart from the heat shield using thermal expansion and/or contraction; and/or machining the columns apart from the heat shield, forming one or more apertures through the heat shield. Additively manufacturing can include forming at least one of: vaulted weight reduction voids within the inner support; and/or vaulted manifold portions of fuel passages in the outer support.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
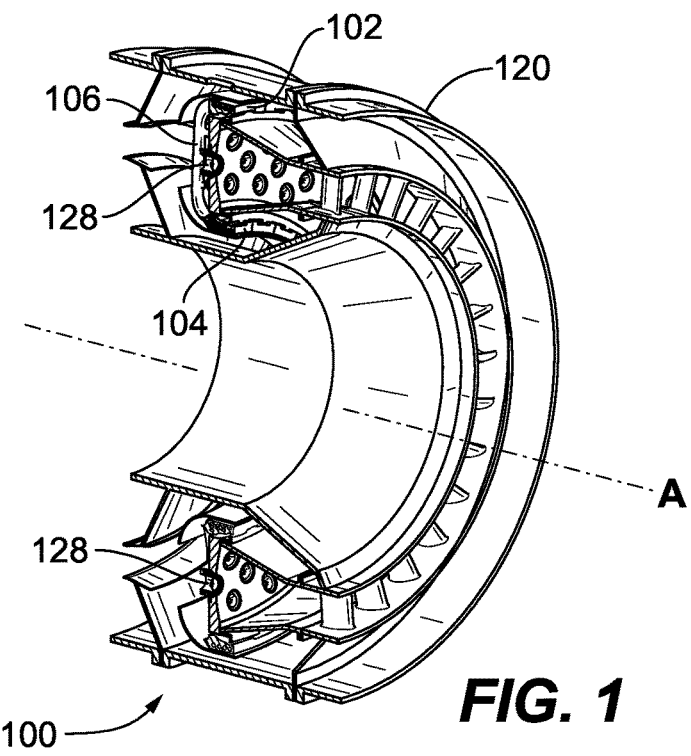
FIG. 1 is a cross-sectional perspective view of an exemplary embodiment of a fuel injector system constructed in accordance with the present disclosure, showing the fuel injector system mounted in an engine case.

Reference will now be made to the drawings wherein like reference numerals identify similar structural features or aspects of the subject disclosure. For purposes of explanation and illustration, and not limitation, a partial view of an exemplary embodiment of a fuel injector system in accordance with the disclosure is shown in FIG. 1 and is designated generally by reference character 100. Other embodiments of fuel injector systems in accordance with the disclosure, or aspects thereof, are provided in FIGS. 2-5, as will be described. The systems and methods described herein can be used to provide heat shielding, e.g. in internally manifolded multipoint fuel injection systems such as in gas turbine engines.

The multipoint fuel injection system 100 includes a circumferentially extending outer support 102 and a circumferentially extending inner support 104, with a plurality of circumferentially spaced apart feed arms 106 extending radially between the inner support 104 and the outer support 102. The outer support 102 and inner support 104 form a pair of rings that defines an axis A.

Figure 2:
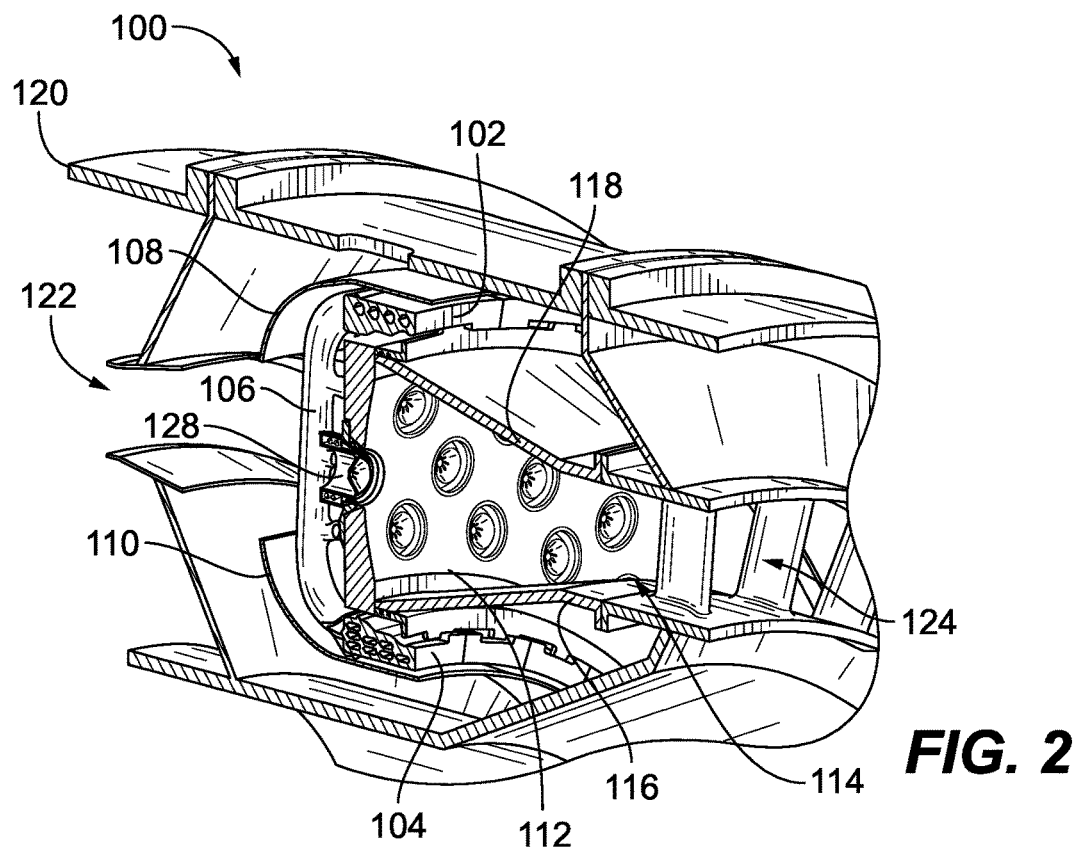
FIG. 2 is a cross-sectional perspective view of a portion of the fuel injector system of FIG. 1, showing the inner and outer supports and one of the feed arms.

With reference now to FIG. 2, an outer diffuser 108 extends in an upstream direction (extending to the left along the direction of axis A which is identified in FIG. 1) from the outer support 102. The outer diffuser 108 is also positioned radially outboard of the outer support 102 to provide heat shielding to the outer support 102. An inner diffuser 110 extends in an upstream direction (extending to the left along the direction of axis A which is identified in FIG. 1) from the inner support 104. The inner diffuser 110 is also positioned radially inboard of the inner support 104 to provide heat shielding to the inner support 104. A combustor dome 112 defines a combustion space 114 with an inner combustor wall 116 and an opposed outer combustor wall 118. The combustor dome 112, inner combustor wall 116, and outer combustor wall 118 are positioned to provide heat shielding to the inner and outer supports 102, 104 on a combustor side thereof. The combustor side of the system 100 is to the right of the feed arm 106 as oriented in FIG. 1. The system 100 can be housed in an engine case 120 to receive compressor discharge air through a compressor opening 122 in the engine case, and to supply combustion products to a turbine through the turbine opening 124 of the engine case.

Figure 3:
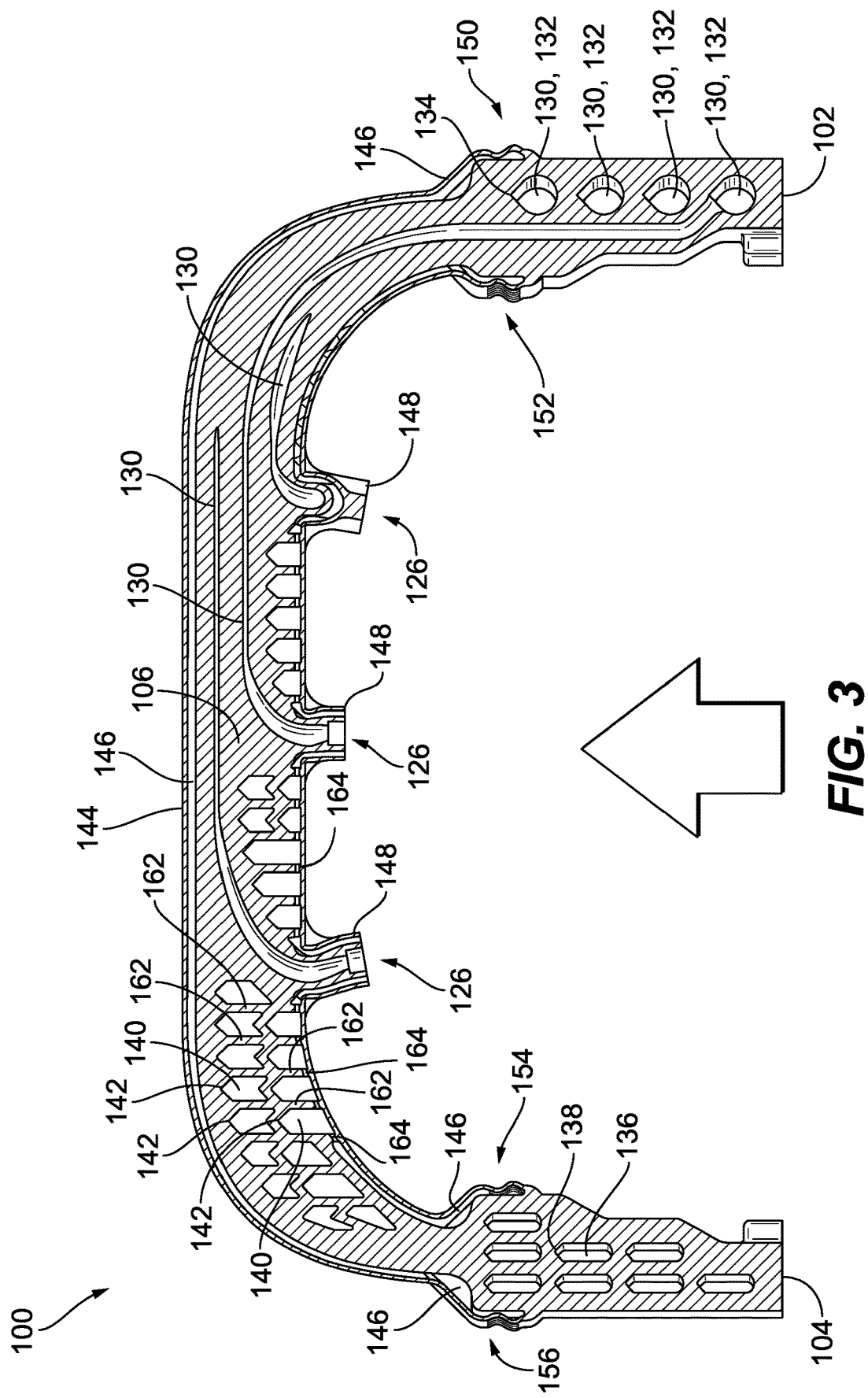
FIG. 3 is a cross-sectional elevation view of the feed arm of FIG. 2, showing the insulation gap between the heat shield and the feed arm.

With reference now to FIG. 3, a plurality of outlet openings 126 extend in an axial direction (with respect to the axis A shown in FIG. 1) from each feed arm 106 for feeding respective injection nozzles 128. FIGS. 1 and 2 show the nozzles 128 for multiple feed arms 106. The outer support 102 and each feed arm 106 define a plurality of fuel passages 130 therethrough to convey fluid from an external source through the outer support 102 and feed arms 106 to the outlet openings 126. The outer support 102 defines a manifold portion 132 of the fuel passages 130 extending therethrough in a circumferential direction (relative to the axis A of FIG. 1), The manifold portions 132 have axially oriented vaulted surfaces, each reaching a peak 134 that extends in an upstream direction relative to the axis A of FIG. 1. The inner support 104 defines weight reduction voids 136 defined therein, wherein the weight reduction voids 136 each have axially oriented vaulted surfaces reaching respective peaks 138 that extend in an upstream direction relative to the axis A of FIG. 1. The feed arm 106 includes a plurality of vaulted chambers 140. Each vaulted chamber 140 includes a pair of vaulted surfaces reaching a respective peak 142 that extends in an upstream axial direction relative to the axis A of FIG. 1. The vaulted surfaces pointing upward as oriented in FIG. 1 facilitate additively manufacturing as described further below.

Figure 5:
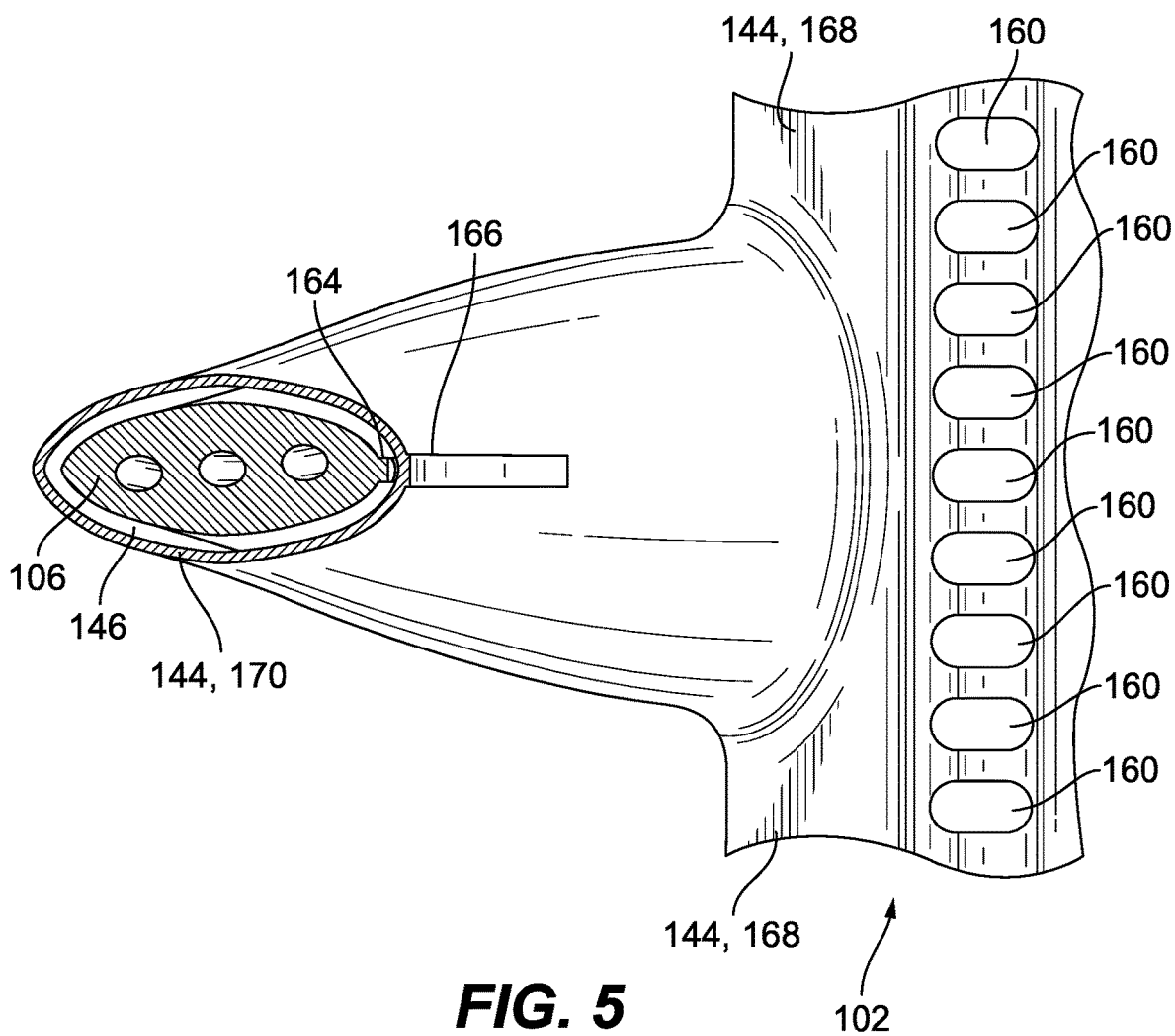
FIG. 5 is a cut-away perspective view of a portion of the system of FIG. 1, showing the circumferential portions of the heat shield.

A single heat shield 144 extends around all of the feed arms 106 from the outer support 102 to the inner support 104. As shown in FIG. 5, circumferential portions 168 of the heat shield 144 extend circumferentially from feed arm portions 170 of the heat shield 144. The heat shield 144 is spaced apart from each feed arm 106 with an insulative gap 146 therebetween. There is a single, contiguous insulative gap 146 shared by all of the feed arms 106.

Figure 4:
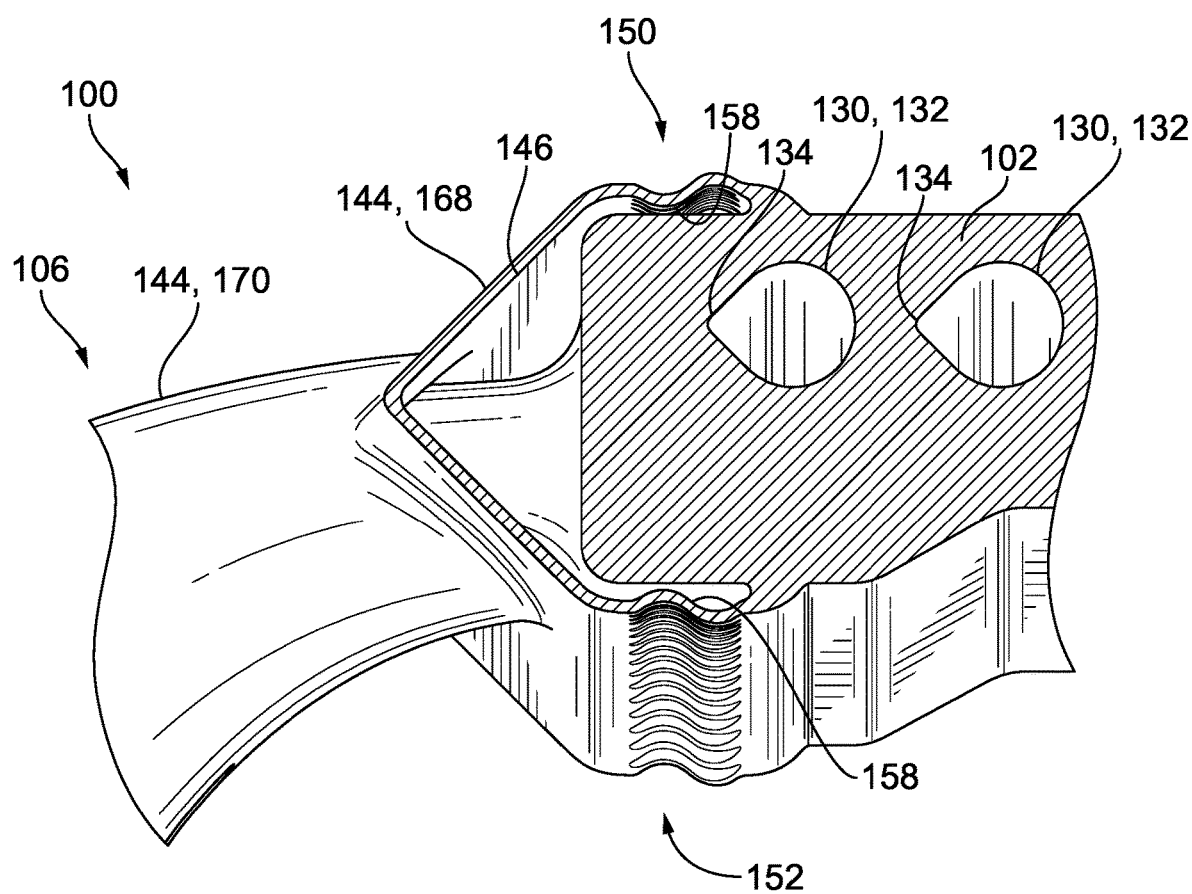
FIG. 4 is a cut-away perspective view of a portion of the system of FIG. 1, showing the flexure structures.

The heat shield 144 includes respective openings 148 therethrough for connection of injection nozzles 128 (identified in FIGS. 1 and 2) to the outlet openings 126 of the feed arm 106. The heat shield 144 is solely supported by flexure structures 150, 152, 154, 156 that connect the heat shield 144 to the inner and outer supports 102, 104. The outermost flexure structure 150 forms a ring around the outside of the outer support 102. The outer interior flexure structure 152 forms a ring around the inside of the outer support 102. The inner interior flexure structure 154 forms a ring around the outside of the inner support 104. The inner most flexure structure 156 forms a ring around the inside of the inner support 104. As shown in FIG. 4, each flexure structure 150, 152, 154, 156 defines a sigmoid cross-sectional shape 158 in radial cross-section to prevent cracking under thermal strains. As shown in FIG. 5, each flexure structure defines a plurality of holes 160 through the heat shield 144 into the insulative gap 146.

With reference again to FIG. 3, the vaulted chambers 140 are each defined between columns 162. The columns 162 initially are formed connected to the heat shield 144 to facilitate additive manufacturing the feed arm 106. The bases 164 of the lower most columns 162 in FIG. 3 are spaced apart from the heat shield 144. This spacing can be accomplished by additively manufacturing the bases 164 to be weak so that they can be broken after additive manufacturing by thermal growth differential between the heat shield 144 and the feed arm 106. It is also contemplated that the bases 164 can be spaced apart from the heat shield 144 after additive manufacturing by machining an aperture 163 through the heat shield 144 proximate the base 164 of each column 162. There can be a respective aperture 163 through the heat shield proximate to each column 162 (only one aperture 163 is shown in FIG. 3), or a single aperture can be formed, e.g. by removing the portion 166 of the heat shield 144 indicated in FIG. 5. Any apertures formed to separate the columns 162 can be covered back over. It is also possible to leave such apertures uncovered as they are formed in low flow portion of the system 100.

A method of making a fuel injector system, e.g., system 100, includes additively manufacturing a circumferentially extending outer support, e.g., outer support 102, together with a circumferentially extending inner support (e.g. inner support 104), a feed arm (e.g. feed arm 106) extending radially between the inner support and the outer support, and a heat shield (e.g., heat shield 144) extending around the feed arm from the outer support to the inner support wherein the heat shield is spaced apart from the feed arm with an insulative gap (e.g. insulative gap 146). Additively manufacturing includes building in an axial direction beginning from downstream portions of the inner and outer supports, i.e. in the build direction indicated by the large arrow in FIG. 3.

Additively manufacturing includes forming the feed arm with a plurality of vaulted chambers (e.g. vaulted chambers 140), therein defined between columns (e.g. columns 162), wherein the columns are attached to the heat shield. The method can include at least one of: breaking the columns apart from the heat shield using thermal expansion and/or contraction; and/or machining the columns apart from the heat shield, forming one or more apertures through the heat shield. Additively manufacturing includes forming at least one of: vaulted weight reduction voids (e.g. voids 136) within the inner support; and/or vaulted manifold portions (e.g. portions 132) of fuel passages in the outer support.

The thinness of the heat shield 144 reduces heat conduction therein. The heat shielding provided by the heat shield reduced formation of carbon deposits in the fuel passages 130 by keeping the temperature of fuel therein below limits needed to prevent carbon formation.

The methods and systems of the present disclosure, as described above and shown in the drawings, provide for multipoint fuel injection systems with superior properties including improved heat shielding. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of making a fuel injector system comprising: additively manufacturing a circumferentially extending outer support together with a circumferentially extending inner support, a feed arm extending radially between the inner support and the outer support, and a heat shield extending around the feed arm from the outer support to the inner support wherein the heat shield is spaced apart from the feed arm with an insulative gap, wherein the additively manufacturing includes building in an axial direction beginning from downstream portions of the inner and outer supports, wherein additively manufacturing includes forming the feed arm with a plurality of vaulted chambers therein defined between columns, wherein the columns are attached to the heat shield, and wherein the columns extend parallel to the axial direction.

2. The method as recited in claim 1, further comprising at least one of:
   breaking the columns apart from the heat shield using thermal expansion and/or contraction; and/or
   machining the columns apart from the heat shield, forming one or more apertures through the heat shield.

3. The method as recited in claim 1, wherein additively manufacturing includes forming vaulted weight reduction voids within the inner support.

4. The method as recited in claim 1, wherein additively manufacturing includes forming vaulted manifold portions of fuel passages in the outer support.

* * * * *